Macek

[11] 3,851,973
[45] Dec. 3, 1974

[54] RING LASER MAGNETIC BIAS MIRROR COMPENSATED FOR NON-RECIPROCAL LOSS
[75] Inventor: Warren M. Macek, Huntington Station, N.Y.
[73] Assignee: Sperry Rand Corporation, New York, N.Y.
[22] Filed: Jan. 3, 1972
[21] Appl. No.: 214,895

[52] U.S. Cl............................ 356/106 LR, 350/151
[51] Int. Cl............................ G01b 9/02, G02f 1/26
[58] Field of Search .............. 356/106 LR; 350/151; 250/225

[56] References Cited
UNITED STATES PATENTS
3,427,092  2/1969  Smith.................................. 350/151
3,496,483  2/1970  Max et al............................ 350/151

Primary Examiner—Ronald L. Wibert
Assistant Examiner—V. P. McGraw
Attorney, Agent, or Firm—Howard P. Terry

[57] ABSTRACT

A ring laser incorporating a magnetic bias mirror forming a corner of the ring optical cavity for imparting a differential phase shift to the contradirectional oscillatory beams circulating in the ring to establish a frequency split therebetween. The bias mirror comprises a magnetic layer deposited on a substrate and overcoated with a plurality of dielectric layers which, exclusive of the layer adjacent the magnetic material, are adjusted in thickness so as to enhance the mirror reflectivity while the thickness of the remaining layer is adjusted to cancel non-reciprocal loss or differential reflection of the contradirectional beams caused by the presence of the magnetic material.

15 Claims, 4 Drawing Figures

3,851,973

RING LASER MAGNETIC BIAS MIRROR COMPENSATED FOR NON-RECIPROCAL LOSS

BACKGROUND OF THE INVENTION

1. Field of the Invention

This invention relates to ring lasers and more particularly to improvements in ring laser magnetic bias mirrors of the type utilizing the transverse Kerr magneto-optic effect for cancelling or eliminating non-reciprocal losses attendant to such devices.

2. Description of the Prior Art

The ring laser is a device capable of functioning as a rate gyroscope. At the present stage of developement of ring laser technology it is generally well known in the art that the two laser beams propagating in the ring tend to lock at the same optical frequency for small rotational rates, resulting in loss of the rotational rate information which is customarily obtained by detecting the beat frequency between the beams. Moreover, the beat frequency information is non-linearly related to the rotational rate for some finite range above the locking point and thus is not accurately representative of rotational rate until the upper limit of this non-linear range is exceeded. Various biasing techniques have been developed in the art for imparting a non-reciprocal phase shift to the contradirectional beams to avoid locking. The biasing action cause each of the beams to oscillate at a discrete frequency sufficiently removed from the locking point so that a predetermined frequency split exists between the beams even in the absence of rotation and affords the further advantage of enabling the sense of rotation to be determined simply by noting whether the beat frequency increases or decreases from the normal bias frequency as the ring rotates.

One of the more recently developed biasing mechanisms comprises a magnetically coated mirror which performs the dual function of providing the desired non-reciprocal phase shift and forming a corner of the ring laser optical cavity. A device of this type is discloed in U.S. patent application Ser. No. 714,891 for "Ring Laser Frequency Biasing Mechanism" filed in the name of R. E. McClure and assigned to the instant assignee. As explained in that application, the bias mirror includes thin magnetic and dielectric layers disposed on a support substrate. The magnetization of the magnetic layer is aligned parallel to the major surface of the mirror and normal to the plane of the ring so as to interact with plane polarized light aligned parallel to the ring plane to produce a non-reciprocal phase shift of the contradirectional beams without distorting the polarization, that is without rotating the polarization from the ring plane or converting it to elliptical form. The interaction between the light beams and magnetic field relied on therefor to produce the bias is the transverse Kerr magneto-optic effect. It has been observed, however, that this effect produces an undesired non-reciprocal loss or differential reflection of the contradirectional beams in addition to the desired non-reciprocal or differential phase shift imparted to the beams.

Non-reciprocal loss occurs as a consequence of the oppositely directed oscillatory beams being differentially reflected from the bias mirror and is believed to be attributed to the presence in the mirror of the magnetic layer which is characterized by a refractive index having both real and imaginary parts. This non-reciprocal loss or differential reflectivity is deleterious to the ring operation because it is likely to result in an undesired varying internal bias in the presence of backscatter. This will be more fully understood from the following comments. Backscatter of either one of the ring oscillatory beams typically results in a portion of the backscatter component coupling into the other beam and is a basic cause of mode locking, the amplitude of the backscatter being proportional to the amplitude of the beam from which it comes. Now, each beam may be regarded as a discrete phasor with the separation therebetween being representative of the magnitude of the beat freuency. Likewise, the backscatter component of each beam may be represented by a phase vector which is always normal to the phasor to which it couples. The resulting vector produced by the original phasor and the backscatter phase vector is therefore representative of the corresponding beam traveling in each direction. It will be appreciated that if the backscatter components are of the same phase and amplitude, each original phasor will be affected to the same degree and the beat frequency will therefore remain constant. On the other hand, when the contradirectional beams are of unequal amplitude, as caused by differential reflection occurring at a magnetic bias mirror, a large component of backscatter from the stronger beam will couple into the weaker beam and conversely with the result that the frequency split between the beams will be altered and thus disturb the nominal bias. A more detailed description of this coupling phenomenon is provided in U.S. patent application Ser. No. 622,983, now U.S. Pat. No. 3,697,181, for "Ring Laser Having Amplitude and Phase Control Crossed-Beam Antilocking Feedback" filed in the names of C. C. Wang et al and assigned to the instant assignee.

It is a principal object of the present invention to provide an improved magnetic bias mirror which compensates for non-reciprocal losses so as to eliminate or at least substantially reduce such losses to a level compatible with a suitable non-reciprocal phase shift and absolute reflectivity.

SUMMARY OF THE INVENTION

A preferred embodiment of a magnetic bias mirror constructed in accordance with the principles of the present invention comprises a substrate coated with a film of magnetic material which in turn is coated over with a plurality of dielectric layers of alternately high and low refractive index. The dielectric layer adjacent the magnetic layer is adjusted in thickness to cancel differential reflectivity of the contradirectional ring laser beams caused by the magnetic film which acts to impart a differential phase shift to the beams for establishing a frequency bias in the ring. The thickness of each of the other layers is adjusted to enhance the reflectivity of the contradirectional beams to compensate for the low reflectivity of the magnetic film.

DESCRIPTION OF THE PREFERRED EMBODIMENT

Figure 1:
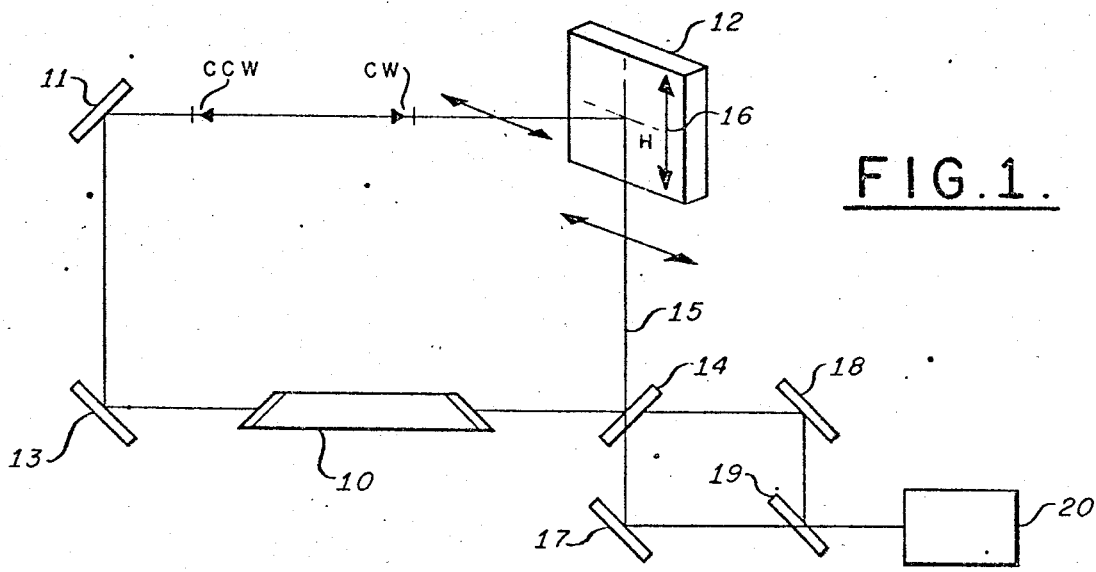
FIG. 1 is a top view schematic illustration of a conventional ring laser incorporating a non-reciprocal loss compensated magnetic bias mirror.

Referring to FIG. 1, an active lasing medium 10 having Brewster angle end windows is oriented to provide plane polarized cw and ccw light beams oriented parallel to the plane of a ring laser optical cavity defined by corner mirrors 11 to 14 which direct the oppositely propagating beams along a closed loop circulatory path 15. As is well understood by those skilled in the art, the wavelength of the laser modes supported in an oscillatory condition is dependent on the length of the cavity closed loop path. In the absence of any rotation of the ring about an axis oriented normal to the plane thereof, or other non-reciprocal phase effects internal to the ring cavity, the contradirectional beams traverse the same path length upon circulating about the cavity and thus oscillate at the same frequency. In the presence of rotation or internal non-reciprocal phase effects, however, the contradirectional beams experience a different path length and oscillate at different frequencies.

Mirror 12 is a magnetic bias element of the type disclosed in the previously mentioned McClure application which is magnetized in a direction parallel to the plane of the mirror and perpendicular to the ring laser plane as indicated by arrow 16. The indicated orientation of the light polarization and magnetization of the bias mirror provide for transverse Kerr magneto-optic effect operation which assures propagation of the beams around the cavity closed loop path without distorting the polarization or introducing Faraday rotation thereto. By the action of the bias mirror, even without ring rotation, non-reciprocal phase shift effects are produced by the mirror to cause the contradirectional beams of a laser oscillatory mode to be split apart and oscillate at different frequencies, the magnitude of the frequency split being dependent among other things upon the magnitude of the magnetization in the bias mirror. Ring rotation then causes the bias frequency split to change by an amount proportional to the ring rotational rate, the change producing an increase or decrease from the bias frequency depending on the direction of the rotation and thereby enabling both rate and sense of rotation to be easily determined. Measurement of the instantaneous beat frequency is performed in a conventional manner by permitting a small portion of the energy in each beam to escape from the cavity as by use of mirror 14 having slightly less than 100 percent reflectivity. The exiting portion of the cw beam, for instance, reflects from mirror 17 and is partially transmitted through beamsplitter 19 onto photodetector 20. Likewise, the exiting portion of the ccw beam reflects from mirror 18 and is subsequently partially reflected from beamsplitter 19 onto the photodetector in which it mixes with the cw beam to produce an output signal having a frequency equal to the frequency difference between the beams.

Figure 2:
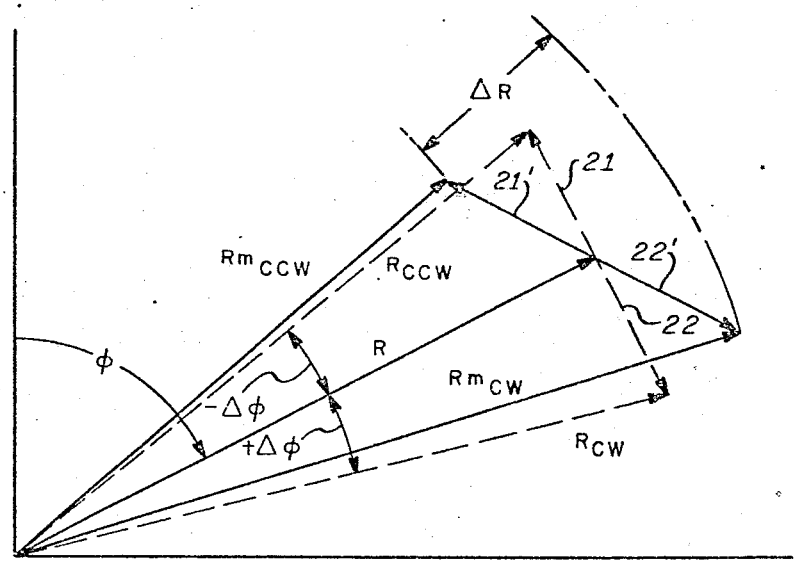
FIG. 2 is a polar coordinate plot depicting phase and amplitude reflection characteristics of a magnetic mirror which is useful in explaining the object of the present invention.

FIG. 2 is a polar coordinate plot of the reflection and phase characteristics of a magnetic mirror. R represents the magnitude of the reflection from a nonmagnetic metallic or dielectric mirror of a light beam assumed to be at some arbitrary phase angle $\phi$. In other words, in the case of a non-magnetic mirror and assuming that non-reciprocal phase shift effects do not exist in the ring so that the contradirectional beams oscillate at the same frequency, each of the beams can be represented by a vector R at an angle $\phi$. The desired result in the case of a magnetic mirror would be for the absolute value of the reflectivity R to be modified in accordance with the dashed vector lines 21 and 22 oriented normal to R to produce resultant equal reflectivity for the contradirectional beams represented by $R_{ccw}$ and $R_{cw}$ which are phase shifted $-\Delta \phi$ and $+\Delta \phi$, respectively, relative to R for a total non-reciprocal or differential phase shift of $2\Delta \phi$. The presence of the magnetic material in the bias mirror, however, causes the vectors 21, 22 actually to be skewed with respect to R as indicated by vectors 21' and 22', causing the resultant vectors $R_{Mccw}$ and $R_{Mcw}$, representative of the respective contradirectional beams, to be non-reciprocally phase shifted and unequal in magnitude. Hence, the magnetic bias mirror while producing the desired non-reciprocal phase shift simultaneously produces a differential reflectivity or non-reciprocal loss which, as explained hereinbefore, is likely to result in a varying internal bias in the presence of backscatter. It has been found, however, in accordance with the teaching of the present invention, that compensation can be provided for eliminating or effectively cancelling the non-reciprocal loss by appropriately controlling the thickness of a dielectric layer superimposed over the magnetic layer of the mirror.

Figure 3:
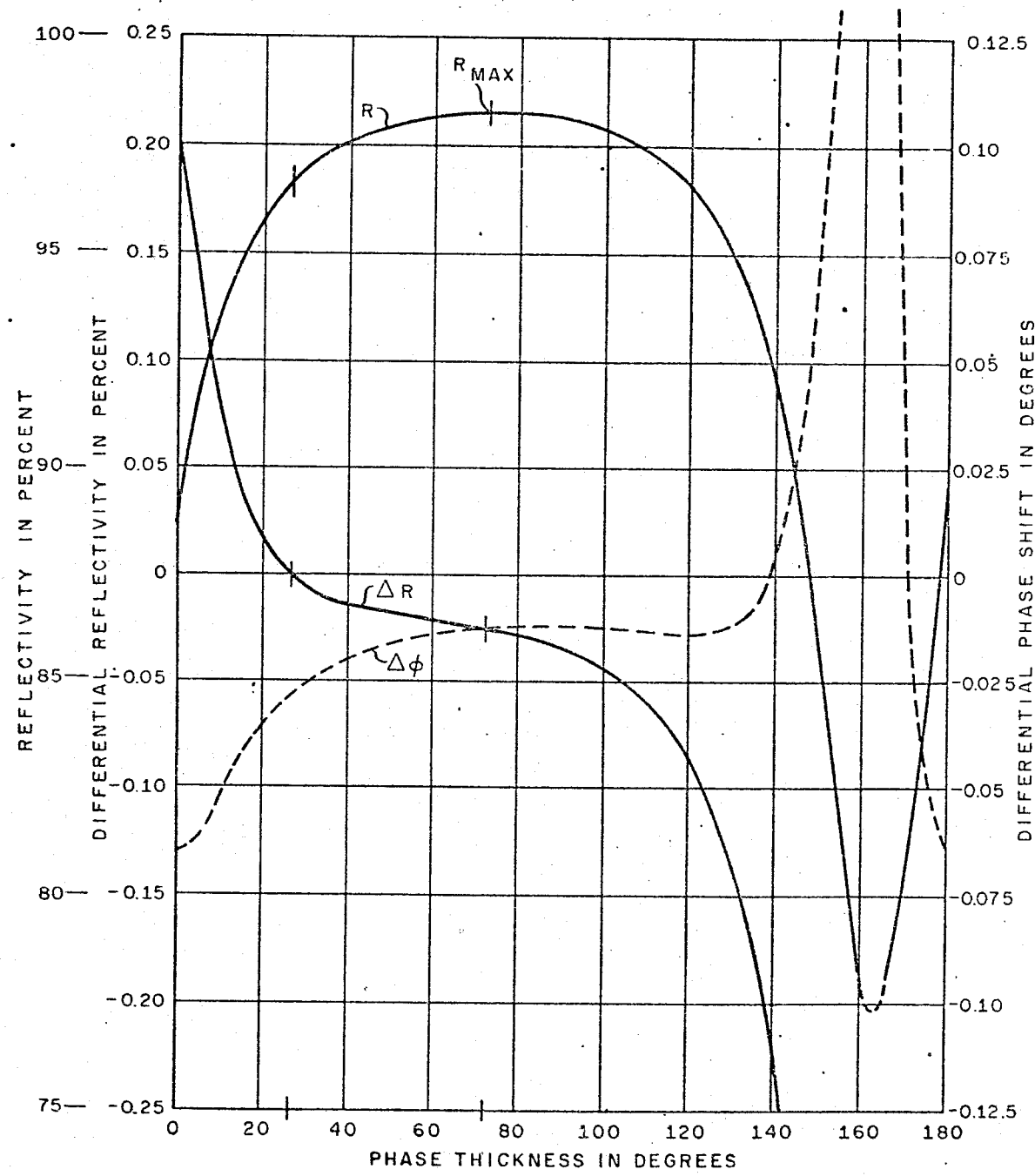
FIG. 3 is a graph showing the variation of total reflection and differential reflectivity and phase shift as a function of dielectric layer thickness for a dielectrically coated magnetic bias mirror.

FIG. 3 is a graph depicting the reflection and phase shift characteristics of a magnetic bias mirror. The illustrated curves relate to a mirror comprising a support substrate coated on one surface with a ferromagnetic layer, such as iron, about 2,000 Angstroms thick and overcoated with 8 layers of zinc sulfide and cryolite as typical dielectric materials. The outer 7 layers remote from the magnetic layer are preferably adjusted in thickness to provide maximum light reflectivity as will be described more fully a little later in connection with FIG. 4. The layer adjacent the magnetic layer, on the other hand, is adjusted in thickness as required to cancel or substantially reduce non-reciprocal loss effects consistent with suitable tradeoffs relating to the absolute or total reflectivity and differential phase shift as now be explained.

The reflection and phase characteristics of FIG. 3 are plotted as a function of the phase thickness of the dielectric layer adjacent the magnetic layer of the mirror. Phase thickness of any layer is related, of course, to the light wavelength, the path of the light through the layer and the refractive index thereof. It will be noted from the graph that the absolute or total reflectivity R reaches a maximum value $R_{max}$ which in this case is approximately coincident with the phase thickness at which cross-over of the differential reflectivity $\Delta R$ and nonreciprocal phase shift $\Delta \phi$ occurs, a phase thickness of about 73°. The general shape of the various curves remains about the same for other dielectric and magnetic materials, combinations thereof and numbers of layers, although the absolute values, zero-axis crossovers and slopes change to some degree. In any case, nonreciprocal loss compensation can be provided as in the illustrated case where it is seen that the differential reflectivity $\Delta R$ curve crosses the zero axis at a particular value of phase thickness for the dielectric layer adjacent the magnetic layer, in the illustrated case about 27°. It is seen that the absolute reflectivity is somewhat lower at this point but is still greater than 96 percent and therefore satisfactory for ring laser operation while the differential phase shift $\Delta \phi$ is increased compared to its value at the point of maximum reflection. Deviation from the exact phase thickness indicated to provide zero non-reciprocal loss may be permitted to achieve slightly increased absolute reflection or non-reciprocal phase shift as desired and is dependent, of course, on the slope of the $\Delta R$ curve in the vicinity of the zero-axis crossing; that is, for a differential reflectivity curve having a small slope in the vicinity of the zero-axis crossing, greater deviations may be made to obtain a particular total reflection or non-reciprocal phase as desired without introducing intolerable non-reciprocal loss. The curves plotted in FIG. 3 were obtained from a computer run of equations defining the absolute reflectivity and differential reflectivity and phase shift as functions of phase thickness of the dielectric layer considered as the independent variable. A mirror constructed in accordance with the plotted data can be tested to confirm the theoretical measurements by measuring the intensity and relative phase of light beams directed onto the mirror in the manner in which it would be directed when inserted in the ring.

Figure 4:
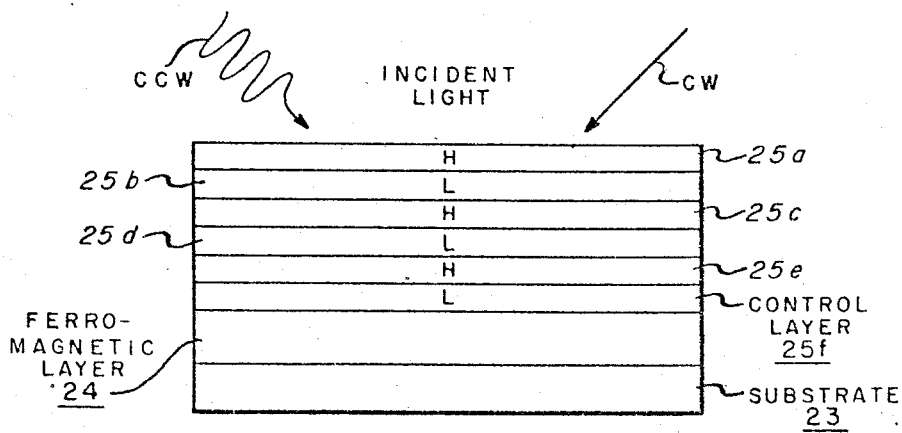
FIG. 4 is a top view of a magnetic bias element embodying the principles of the invention.

Referring now to FIG. 4, a biasing element incorporating means for achieving a non-reciprocal phase shift without attendant non-reciprocal loss, or at least substantially reduced loss, comprises a supporting or substrate member 23 constructed of a material such as quartz, glass or aluminum, a magnetic layer 24 of ferromagnetic material such as iron and a plurality of dielectric layers 25a to 25f of alternately high and low refractive index. The dielectric and magnetic layers typically measure about 3,000 Angstroms thick and may be deposited on the substrate in accordance with conventional techniques. Each of the dielectric layers 25a to 25e has a phase thickness for the wavelength and path of the light passing therethrough so that the light reflected from the back surface of each layer is in phase with the light reflected from the front surface. The alternately high and low refractive indices of the successive layers provide proper impedance matching to assure the desired reflection characteristic. Thus, with the mirror oriented in the ring so that the cw and ccw beams first impinge on the high refractive index layer 25a having a refractive index higher than the air path of the ring beams, light reflected from the front surface thereof is reflected with a phase shift of 180° while the portion of the light reflected from the rear surface at the interface of layers 25a and 25b is reflected with zero phase shift. The light reflected from the rear surface, however, travels an additional phase length of 180° in traversing twice across the layer 25a (1/4 wavelength thick) and therefore is in phase with the 180° phase shifted light reflected from the front surface. Likewise, the light reflected from the rear surface of layer 25b at the interface with the front surface of high index layer 25c is reflected with 180° phase shift whereupon, after traveling back to the interface of layers 25a and 25b, it is in phase with the light reflected therefrom. The same action occurs at the interfaces of each of layers 25a to 25e and thus maximizes the total reflection from these layers. The phase thickness of the last dielectric layer 25f, however, is not selected from the purpose of maximizing the total reflectivity but rather, as hereinbefore explained, to reduce or effectively cancel the non-reciprocal loss or differential reflectivity of the contradirectional beams, even at the expense of some degradation of the total light reflection. The reflectivity of the magnetic layer is typically less than 70 percent and perhaps as low as 40 percent and therefore is generally unsuitable by itself for ring laser corner mirror design without the provision of some means such as the dielectric layers for increasing the overall reflectivity to about 90 percent and preferably higher than 95 percent. In view of the low reflectivity to the magnetic layer and its effectively greater thickness attendant to its greater absorption per unit thickness than the dielectric layers, most of the light reflection at the magnetic layer occurs near the front surface or after only slight penetration thereof. Hence, the phase relation between light reflected from the front and rear surfaces of the magnetic layer is of little or no consequence.

In summary, each of the dielectric layers, exclusive of the one adjacent the magnetic layer, has a single pass phase thickness for the light wavelength and path direction therethrough of 90° or a total forward and back phase thickness of 180° to enhance the absolute or total reflectivity in compensation for the low reflectivity of the magnetic layer. The dielectric layer adjacent the magnetic layer, on the other hand, has a total forward and back phase thickness selected to cancel the non-reciprocal loss introduced by the presence of the magnetic layer, while the thickness of the latter is made sufficiently great so that essentially no light is reflected from its rear surface.

As explained in the prior McClure application, the magnetic layer may preferably be constructed of a material exhibiting a square loop hysteresis characteristic so that it has a high degree of magnetic remanence in which case the mirror is required to be magnetized only once initially to establish the remanent magnetization. In the case of other materials of low remanence, however, means must be provided for continuously magnetizing the mirror. In any event, even where the material has a high degree of remanence, it may be desired to provide means such as a magnet adjacent the mirror for the purpose of reversing the magnetization to effect a bias reversal.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A ring laser comprising
means forming a closed loop optical cavity containing an active lasing medium for providing contradirectional light beams propagating along a closed loop circulatory path in the optical cavity,
said optical cavity forming means being constructed, at least in part, of a frequency biasing light reflective multilayer member for imparting a differential phase shift to the contradirectional beams, said multilayer member including a magnetizable layer coated with at least one dielectric layer which has a thickness determined in accordance with the refractive index of the dielectric layer and wavelength and angle of incidence of the contradirectional beams on the multilayer member for substantially eliminating differential reflection of the contradirectional beams normally occurring at the multilayer member from the presence of the magnetizable layer while preserving non-reciprocal phase shift caused thereby.

2. The apparatus of claim 1 wherein the magnetizable layer is constructed of a magnetically saturable material.

3. The apparatus of claim 1 wherein the magnetizable layer is magnetized in a direction normal to the plane of incidence of the contradirectional beams impinging on the multilayer member and the beams are plane polarized parallel to the plane of incidence.

4. The apparatus of claim 1 wherein the optical cavity has a planar configuration, the contradirectional waves incident on the light reflective multilayer member are plane polarized parallel to the ring plane, and the magnetizable layer is magnetized in a direction normal to the ring plane.

5. The apparatus of claim 1 wherein the respective layers are arranged so that the contradirectional beams incident on the light reflective multilayer member first strike the dielectric and propagate therethrough to impinge on the magnetizable layer.

6. The apparatus of claim 5 wherein the magnetizable layer has a thickness determined in accordance with its light absorption characteristic such that light which is not reflected from the magnetizable layer surface region adjacent the dielectric layer is substantially absorbed in the course of propagating through the magnetizable layer.

7. The apparatus of claim 6 wherein the ring laser cavity has a planar configuration, the contradirectional waves incident on the light reflective multilayer member are plane polarized parallel to the plane of the ring, and the magnetizable layer is magnetized normal to the ring plane.

8. The apparatus of claim 1 including a plurality of additional dielectric layers coated one on another over said dielectric layer, each additional dielectric layer having a phase thickness of approximately 180° for the total forward and back pathlength therethrough of contradirectional beams of predetermined wavelength and propagational direction.

9. A ring laser comprising
means forming a closed loop optical cavity containing an active lasing medium for providing contradirectional light beams propagating along a closed loop circulatory path in the optical cavity and plane polarized parallel to the plane of incidence of the beams on a light reflective multilayer frequency biasing member which constitutes a part of said optical cavity forming means for imparting non-reciprocal phase shift to the beams, said light reflective multilayer member comprising a magnetic layer magnetized in a direction normal to the plane of incidence of the contradirectional beams impinging thereon and a plurality of dielectric layers of alternately high and low refractive index coated one on another over the magnetic layer, the dielectric layer adjacent the magnetic layer having a thickness determined in accordance with the refractive index of said adjacent dielectric layer and the wavelength of the beams and the incidence angle thereof on the light reflective multilayer member so as to substantially eliminate non-reciprocal losses normally occurring at the multilayer member from the presence of the magnetic layer while preserving non-reciprocal phase shift produced thereby, and the remaining dielectric layers each having a phase thickness of approximately 180° for the total forward and back pathlength of the contradirectional beams traveling therethrough to enhance the absolute reflection of the light reflective multilayer member.

10. The apparatus of claim 9 wherein the magnetic and dielectric layers are so constructed and arranged that the contradirectional light beams incident on the light reflective multilayer member first strike the dielectric layers and propagate therethrough to the magnetic layer.

11. The apparatus of claim 10 wherein the thickness of the magnetic layer in the direction of beam propagation is such that only light reflected from the front surface and the region slightly in back of the adjacent dielectric layer, to the exclusion of light reflected from the opposite surface of the magnetic layer, is effective in producing non-reciprocal loss and phase effects.

12. The apparatus of claim 11 wherein the optical cavity has a planar configuration, the contradirectional waves incident on the light reflective multilayer member are plane polarized parallel to the plane of the ring, and the magnetization of the magnetic layer is oriented normal to the ring plane.

13. The apparatus of claim 12 wherein the magnetic layer is constructed of a magnetically saturable material.

14. The apparatus of claim 13 wherein the respective magnetic and dielectric layers each have a planar configuration.

15. The apparatus of claim 5 wherein the magnetizable layer is magnetized in a direction normal to the plane of incidence of the contradirectional beams impinging on the multilayer member and the beams are plane polarized parallel to the plane of incidence.

* * * * *